United States Patent [19]

Mitchell

[11] 3,938,576
[45] Feb. 17, 1976

[54] RIMS FOR PNEUMATIC TIRES
[75] Inventor: William Eric Mitchell, Coventry, England
[73] Assignee: Dunlop Limited, London, England
[22] Filed: Dec. 14, 1973
[21] Appl. No.: 424,827

[30] Foreign Application Priority Data
Dec. 15, 1972 United Kingdom............... 58156/72

[52] U.S. Cl......... 152/379 R; 152/405; 152/DIG. 10
[51] Int. Cl.²......................................... B60B 25/00
[58] Field of Search........... 301/63 R, 63 DD, 63 D, 301/63 PW, 97, 98, 9 R; 152/397, 398, 396, 402, 403, 404, 405, 381, 379, 345, DIG. 17, DIG. 9, DIG. 10

[56] References Cited
UNITED STATES PATENTS

| | | |
|---|---|---|
| 1,285,630 | 11/1918 | Culp .................................. 301/63 D |
| 1,333,679 | 3/1920 | Rey.................................... 152/398 |
| 1,410,044 | 3/1922 | Williams ............................ 152/405 |
| 3,708,847 | 1/1973 | Mitchell.......................... 152/379 R |

FOREIGN PATENTS OR APPLICATIONS

| | | |
|---|---|---|
| 1,141,234 | 3/1957 | France............................... 301/63 D |
| 1,449,826 | 7/1966 | France............................... 152/381 |
| 601,884 | 12/1955 | Canada.......................... 152/DIG. 9 |
| 1,237,238 | 6/1960 | France......................... 152/DIG. 10 |

Primary Examiner—M. Henson Wood, Jr.
Assistant Examiner—Reinhard J. Eisenzopf
Attorney, Agent, or Firm—Stevens, Davis, Miller & Mosher

[57] ABSTRACT

A divided or one piece wheel rim comprising two tire bead retaining flanges with inclined bead seating portions and a substantially flat well base portion positioned therebetween. A radially inwardly tapering groove being provided adjacent the toe portion of an associated tire bead.

6 Claims, 4 Drawing Figures

RIMS FOR PNEUMATIC TIRES

This invention relates to rims for pneumatic tires, and particularly but not exclusively to rims for use in a pneumatic tire and rim assembly of the kind described in the specification of co-pending patent application Ser. No. 276,449 of July 31, 1972 now U.S. Pat. No. 3,859,429.

Application No. 276,449 now U.S. Pat. No. 3,857,429 relates to a rim and tire assembly which incorporates a flat-based rim of relatively narrow width compared to the width of the associated tire tread, the beads of the tire being provided with extended rubber toe portions which are of specific value in preventing the beads from moving from their seats when the tire is deflated.

In the specification of the co-pending application referred to above, a rim is illustrated in which a groove is provided adjacent the "outboard" tire bead (i.e. the outboard tire bead relative to a vehicle to which the tire is fitted) to co-operate with the extended toe portion of the bead so as to resist displacement of that bead from its seat.

It is an object of the present invention to provide a rim profile having particular advantages for use in such an assembly.

According to the present invention, a rim for a pneumatic tire comprises an outboard rim part and an inboard rim part, the profile of the outboard rim part considered in a plane containing the axis of the rim comprising, in sequence, a radially extending bead retaining flange having a radially outer edge which is turned axially outwardly of the rim to provide a support surface of substantial axial width for the sidewall of a pneumatic tire, a curved seating region for the heel of a tire bead extending into a frusto-conical bead seating region tapering radially inwardly towards the axially inner region of the rim and extending axially inwardly to a radially inwardly curving bead toe seating region having a radius of curvature in the range 5 to 9 millimeters; the curved toe seating region terminating in a plane spaced axially at a distance in the range 18 to 20 millimeters from the plane of the inner surface of the bead retaining flange, the inboard rim part being joined to the outboard rim part in the plane of termination of the said curved toe seating region and when considered in a plane containing the axis of the rim having a profile adjacent said plane of termination which substantially mirrors that of said curved toe seating region and leads into an axially extending base portion having a diameter lying in the range 2 to 3 millimeters less than the nominal rim diameter as measured at the point where the plane of the inner surface of the bead retaining flange joins a line tangential to the inclined bead seating portion, the base portion terminating in a second frusto-conical bead seating region which increases in diameter towards the end remote from the outboard rim part, the second bead seating region terminating in a curved heel seating region and tire bead retaining flange the profiles of which considered in a plane containing the axis of the rim substantially mirror the corresponding profiles of the outboard rim part, the bead seating region of each rim part being inclined radially inwardly at an angle of 5° to the axis of the rim.

Preferably, in order to provide adequate support for the sidewalls of a deflated tire, the axially extending portions of the bead retaining flanges have an axial width of at least 10 millimeters, and a radius of curvature (concave towards the axis of the rim) of 12 to 16 millimeters in the radially outermost region thereof, the radially outermost region merging through a shoulder region with the radially extending portion of the flange, the shoulder region having a radius of curvature of 7 to 9 millimeters.

Throughout the specification the words "axial" and "axially" are understood to refer to a direction parallel to the axis of rotation of the wheel, and the words "radial" and "radially" are understood to refer to a direction perpendicular to the axis of rotation of the wheel.

One embodiment of the invention will now be described with reference to the accompanying drawings in which.

Figure 3:
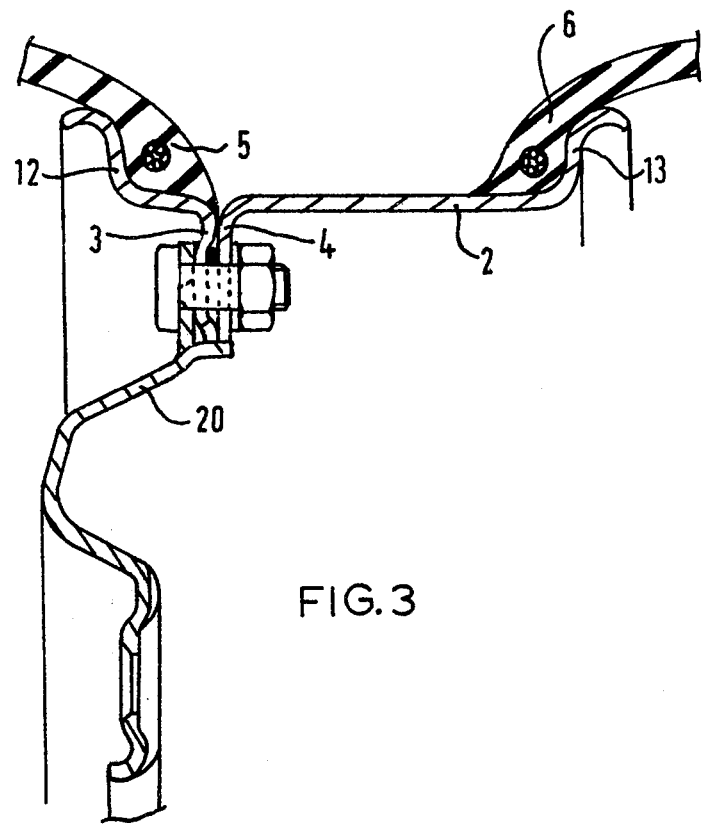
FIG. 3 is a further cross-sectional view of the tire and rim assembly.

The rim comprises a narrower outboard rim part 1 secured to a broader inboard rim part 2 by means of flanges 3 and 4 formed respectively on the two rim parts. The joint between the rim parts is sealed and the rim parts are held together and secured to a disc portion 20, by means of studs and nuts shown in FIG. 3 and as described in the specification of co-pending patent application Ser. No. 370,707 of June 18, 1973 now Pat. No. 3,880,219.

A pneumatic tire having beads 5 and 6 reinforced with inextensible bead wires 7 and 8 respectively is seated on the rim. The tire beads 5 and 6 incorporate extended toe portions 9 and 10 respectively which are of unreinforced rubber and which tend to lie naturally in the configuration as illustrated for the toe 9, which enters a groove 11 of tapering cross-section which is formed at the joint between the two rim parts.

The rim illustrated has a diameter, measured to the line D—D (of FIG. 1) of 350 millimeters, and an axial width W of 105 millimeters, measured between the inside surfaces of the bead retaining flanges 12 and 13 respectively (A—A to B—B). In the following description of the rim, references to the contour and dimensions of the rim profile are intended to apply to the radially outer surface of the rim.

Figure 2:
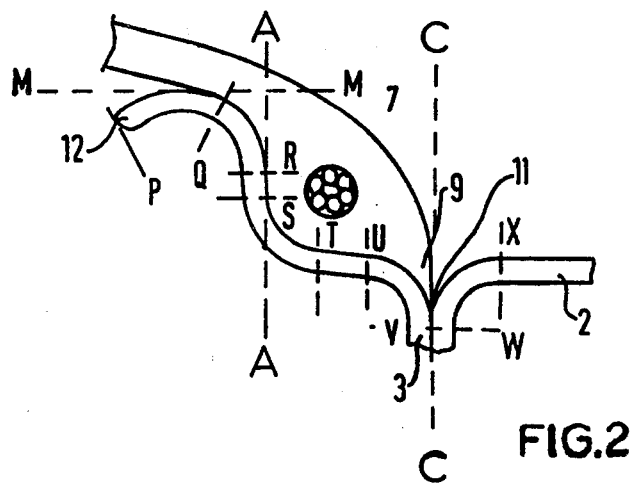
FIG. 2 is an enlarged view of a part of FIG. 1.

The bead retaining flange 12 of the narrow rim part 1 comprises an axially turned outer edge which provides a broad support surface for the sidewall of a deflated tire. The profile of the outer edge of the flange 12 is formed with a radius of curvature of 14 millimeters in the region between the dotted lines P and Q in FIG. 2, merging into a shoulder portion Q–R having a radius of curvature of 8 millimeters.

The curved shoulder portion Q–R merges into a radially extending portion R–S which is then joined to the frusto-conical bead seating portion T–U by a curved heel seating region S–T having a radius of curvature of 6 millimeters.

The axial length of the bead seating region T–U is 7 millimeters, and the angle which its axial cross-sectional profile makes with the axis of the wheel is 5°.

The bead seating region T–U extends to a position, indicated by the dotted line U, spaced axially at a distance of 12 millimeters from the plane A—A of the inner surface of the flange 12. The narrow rim part 1 then terminates in a radially inwardly curving toe seating region U–V having a radius of curvature of 6 millimeters which leads into the flange 3 along the plane of termination C—C.

Figure 1:
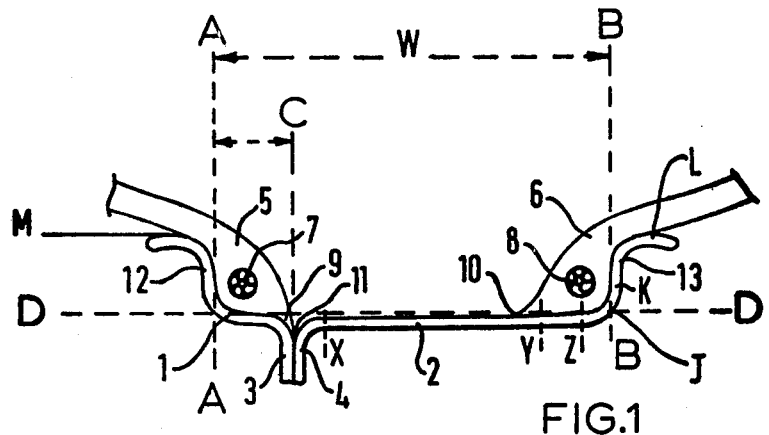
FIG. 1 is an axial cross-sectional view showing part of a rim in accordance with the invention having a pneumatic tire seated thereon.

The broad rim part 2 comprises a curved portion W–X having a similar profile to that of the portion U–V and leading into an axially extending base portion X–Y (see FIG. 1). A second bead seating region Y–Z makes an angle of 5° with the axis and extends for an axial length of 8 millimeters from the position Y which is spaced axially at a distance of 14.2 millimeters from the inside surface of the flange 13 (line B—B).

The heel seating region J, radial flange portion K and axially turned portion L of the broad rim part 2 are substantially identical with the corresponding portions of the narrow rim part 1 and will not be described in detail.

It has been found that a rim formed with a profile as described above provides an effective mounting arrangement for a tire designed to be capable of running while deflated for a limited period. The shallow curvature of the outer parts of the rim flange, achieved by the merging of two surfaces of differing radii, is of particular value in supporting the sidewalls of the deflated tire, while the groove 11 provides a firm anchorage for the extended toe 11 of the outboard tire bead 5, preventing the tire from moving on the rim and thus losing directional stability. The profile and dimensions of the bead seating regions and, particularly, of the groove 11 are critical to the performance of the tire/wheel combination in the deflated condition, and the rim profile and its dimensions as described above has been found to be outstandingly effective in resisting axial movement of the outboard tire bead from its seat.

Axial movement of the inboard tire bead in an outboard direction is also resisted by the extended toe 10 which can slide easily over the rim base portion X–Y in the inboard direction, i.e. towards the flange 13, but can only be moved with difficulty in the outboard direction.

The following table of rim dimensions are examples of individual sizes of rims as described above.

| A | B | C | D |
|---|---|---|---|
| 310 | 80 | 18 | 307.5 |
| 325 | 90 | 20 | 322.5 |
| 350 | 105 | 20 | 347.5 |
| 350 | 90 | 20 | 347.5 |
| 375 | 105 | 20 | 372.5 |
| 375 | 135 | 20 | 372.5 |
| 400 | 135 | 20 | 397.5 |

All dimensions in millimeters.
KEY
A = the nominal rim diameter
B = the axial width of the rim shown as W in FIG. 1.
C = the distance between the plane of termination of the curved bead toe seating region of the outboard rim part to the plane of the inner surface of the bead retaining flange of the same rim part (the distance between A-A and C-C of FIG. 2).
D = the diameter of the axially extending base portion of the inboard rim part.

Figure 4:
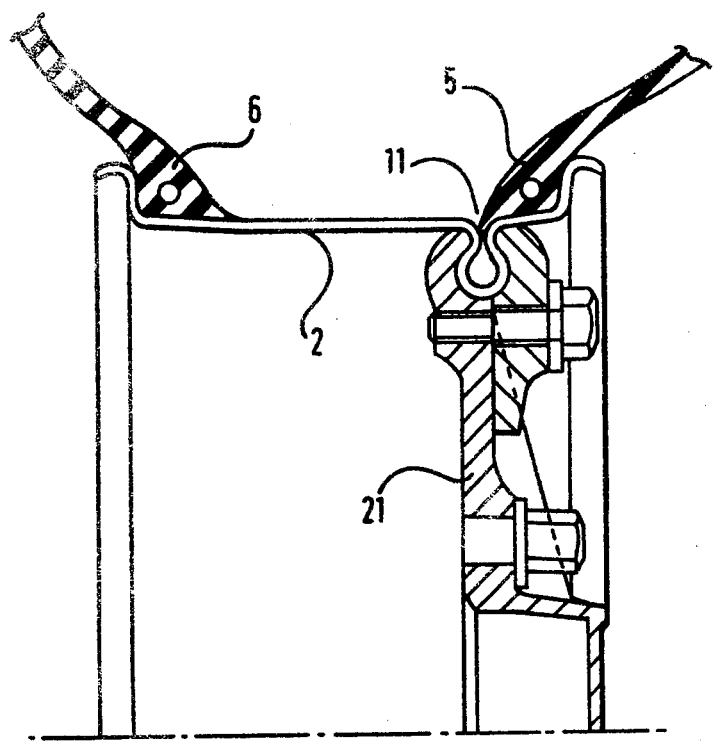
FIG. 4 is a cross-sectional view of an alternative type of rim assembly.

Although in the embodiment described above and illustrated in FIGS. 1 to 3, a rim of the divided type is utilized, the rim may equally be formed in one part with the groove 11 for the bead toe formed integrally with the rim base, (as shown in FIG. 4). In a one part rim of the above type, the rim (not shown) is originally provided with a shallow well portion (not shown) which allows the tire to be fitted in the conventional manner. The well is subsequently axially deformed to form a groove for the toe of the bead. The rim is then detachably secured to a disc portion 21 substantially as shown in FIG. 4 of the drawings.

While the rim design described above is of particular value in use with a tire having an extended bead toe as described, and the axially turned outer edges of the bead retaining flanges provide good support for the sidewalls of a deflated tire; the rim in accordance with the invention is also well suited to use with an internal tire tread support which is designed to take the load when the tire is deflated. Such a support may be an annular member, for example of light but rigid plastics material fitted around the base of the rim and bridging the space between the beads or may comprise an annular plate fitted between the rim parts and having an axially turned flange to support the tread of a deflated tire as described in the specification of co-pending patent application No. 392,558 of Aug. 29, 1973. In both of these cases one or both of the tire beads may be held in position by the tread support; in the case of the flange-type support the portion of the support fitted between the rim parts will serve to retain the outboard tire bead on its seat.

Having now described my invention, what I claim is:

1. A rim for a pneumatic tire and rim assembly which may be used when the tire is in a deflated state comprising an outboard rim part and an inboard rim part detachably secured together, the profile of the outboard rim part considered in a plane containing the axis of the rim comprising, in sequence, a radially extending bead retaining flange having a radially outer edge which is turned axially outwardly of the rim to provide a support surface of substantial axial width for the sidewall of a pneumatic tire, a curved seating region for the heel of a tire bead extending into a frusto-conical bead seating region tapering radially inwardly towards the axially inner region of the rim and extending axially inwardly to a radially inwardly curving bead toe seating region having a radius of curvature in the range 5 to 9 millimeters; the curved toe seating region terminating in a plane spaced axially at a distance in the range 18 to 20 millimeters from the plane of the inner surface of the bead retaining flange, the inboard rim part being joined to the outboard rim part in the plane of termination of the said curved toe seating region and when considered in a plane containing the axis of the rim having a profile adjacent said plane of termination which substantially mirrors that of said curved toe seating region and leads into an axially extending base portion having a diameter lying in the range 2 to 3 millimeters less than the nominal rim diameter as measured at the point where the plane of the inner surface of the bead retaining flange joins a line tangential to the inclined bead seating portion, the base portion terminating in a second frusto-conical bead seating region which increases in diameter towards the end remote from the outboard rim part, the second bead seating region terminating in a curved heel seating region and tire bead retaining flange the profiles of which considered in a plane containing the axis of the rim substantially mirror the corresponding profiles of the outboard rim part, the bead seating region of each rim part being inclined radially inwardly at an angle of 5° to the axis of the rim.

2. A rim according to claim 1 wherein the curved heel seating region of each rim part has a radius of curvature in the range within 5 to 7 millimeters, the bead seating region has an axial length of in the range 5 to 10 millimeters and extends axially inwardly to a position at a distance from 10 to 15 millimeters from the plane of the inner surface of the bead retaining flange, the second frusto-conical bead seating region having an axial length in the range of 6 to 10 millimeters.

3. A rim according to claim 1 wherein the axially extending portions of the bead retaining flanges have an axial width of at least 10 millimeters measured from the axially outermost portion of the flange to the plane of the inner surface of the bead retaining flange, and a radius of curvature (concave towards the axis of the rim) within the range 12 to 16 millimeters in the radially outermost region thereof, the radially outermost region merging through a shoulder region (Q-R) with a radially extending portion of the flange, the shoulder region (Q-R) having a radius of curvature within the range 7 to 9 millimeters and the bead retaining flanges having a radial height in the range of 16 to 18 millimeters measured from a line joining the point of measurement of the nominal rim diameter of both rim parts.

4. A vehicle wheel comprising a rim according to claim 1 having a disc portion attached thereto.

5. A tire and wheel assembly comprising a pneumatic tire mounted on a wheel according to claim 4.

6. A tire and wheel assembly comprising a wheel according to claim 1 having a tire mounted thereon, said tire having a pair of beads with bead heels seated on said curved seating regions and at least the outboard bead having a toe portion extending radially inwardly of the associated heel portion as a radially inwardly directed annulus with the distal end thereof projecting into said curving bead toe seating region.

* * * * *